(12) United States Patent
Takayama et al.

(10) Patent No.: US 8,636,350 B2
(45) Date of Patent: Jan. 28, 2014

(54) INK, INK CARTRIDGE, AND INK JET RECORDING METHOD

(75) Inventors: Hideki Takayama, Fujisawa (JP); Eiichi Nakata, Kawasaki (JP); Yoshio Nakajima, Yokohama (JP); Yuhei Shimizu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 172 days.

(21) Appl. No.: 13/214,980

(22) Filed: Aug. 22, 2011

(65) Prior Publication Data

US 2012/0050383 A1 Mar. 1, 2012

(30) Foreign Application Priority Data

Aug. 31, 2010 (JP) ................................ 2010-194045

(51) Int. Cl.
*C09D 11/00* (2006.01)

(52) U.S. Cl.
USPC .......................................................... 347/100

(58) Field of Classification Search
USPC .......................................................... 347/100
See application file for complete search history.

(56) References Cited

U.S. PATENT DOCUMENTS

2005/0052515 A1* 3/2005 Udagawa et al. ............. 347/100
2009/0176071 A1* 7/2009 Koganehira et al. ....... 428/195.1

FOREIGN PATENT DOCUMENTS

| JP | 2000-345080 A | 12/2000 |
| JP | 03455764 B2 | 10/2003 |
| JP | 2006-070123 A | 3/2006 |

* cited by examiner

*Primary Examiner* — Laura Martin
(74) *Attorney, Agent, or Firm* — Canon U.S.A., Inc., IP Division

(57) ABSTRACT

An ink includes a plurality of pigments, a plurality of water-soluble polymers, a surfactant, and a water-soluble organic solvent. The surfactant includes a polyoxyethylene alkyl ether having an HLB value of 13.0 or more as a value determined by a Griffin method, the plurality of pigments include C.I. Pigment Yellow 74 and C.I. Pigment Yellow 128, the plurality of water-soluble polymers include an acrylic polymer and a urethane polymer, and the water-soluble organic solvent includes a compound represented by the following Formula (1): HO—$(CH_2CH_2O)_n$—H, wherein n is an integer of 1 to 4.

18 Claims, No Drawings

INK, INK CARTRIDGE, AND INK JET RECORDING METHOD

BACKGROUND OF THE INVENTION

1. Field of the Invention

The present invention relates to a pigment-containing ink that is suitable as a yellow ink for ink jet recording, and relates to an ink cartridge including the ink, and an ink jet recording method.

2. Description of the Related Art

Recently, there is a demand for further increasing light resistance of images obtained by ink jet recording method. As inks that can improve light resistance, pigment inks containing pigments have been used. However, the pigment inks are usually low in color developability of images compared to dye inks that contain dyes, and it is therefore necessary to develop a pigment ink that can achieve both high light resistance and good color developability. In particular, in yellow inks, it is difficult to form an image having both high light resistance and good color developability, that is, these properties are contradictory to each other.

For example, an ink containing both C.I. Pigment Yellow 74 and C.I. Pigment Yellow 128 is proposed for achieving both good color developability and high light resistance of images (see Japanese Patent No. 03455764). In addition, a recording method in which a high-density region is recorded with an ink containing C.I. Pigment Yellow 74 and a low-density region is recorded with an ink containing C.I. Pigment Yellow 128 is proposed for achieving both good color developability and high light resistance of images (see Japanese Patent Laid-Open No. 2000-345080).

Furthermore, pigment inks contain pigments in particle states and thereby have problems that the glossiness of images obtained is low compared to that of images formed with dye inks dissolving coloring materials in molecular states in aqueous media. A pigment ink containing a urethane polymer in addition to an acrylic polymer for dispersing a pigment is proposed for improving glossiness of images formed with the ink (see Japanese Patent Laid-Open No. 2006-070123).

As described above, yellow inks containing pigments as the coloring materials may be required to provide images having both good color developability and high light resistance and also having improved glossiness.

However, in the above-mentioned inks described in Japanese Patent No. 03455764 and Japanese Patent Laid-Open No. 2000-345080, though both the color developability and the light resistance of obtained images are improved, the glossiness of the images is still insufficient. Accordingly, the present inventors investigated application of the technology of further adding a urethane polymer described in Japanese Patent Laid-Open No. 2006-070123 to an ink containing C.I. Pigment Yellow 74 and C.I. Pigment Yellow 128 as described in Japanese Patent No. 03455764. However, it was confirmed that the glossiness of obtained images could not satisfy the level recently required.

SUMMARY OF THE INVENTION

Accordingly, aspects of the present invention provide an ink that can form images having excellent color developability and light resistance and also showing high glossiness, and provide an ink cartridge including the ink, and an ink jet recording method.

That is, the ink according to aspects of the present invention includes a plurality of pigments, a plurality of water-soluble polymers, a surfactant, and a water-soluble organic solvent, wherein the surfactant is a polyoxyethylene alkyl ether having an HLB value of 13.0 or more as a value determined by a Griffin method, the plurality of pigments include C.I. Pigment Yellow 74 and C.I. Pigment Yellow 128, the plurality of water-soluble polymers include an acrylic polymer and a urethane polymer, and the water-soluble organic solvent includes a compound represented by the following Formula (1):

$$HO\text{---}(CH_2CH_2O)_n\text{---}H \qquad \text{Formula (1)}$$

Wherein in Formula (1), n is an integer of 1 to 4.

Further features of the present invention will become apparent from the following description of exemplary embodiments.

DESCRIPTION OF THE EMBODIMENTS

The present invention will now be described in detail with reference to preferred embodiments. Note that in this specification, the term "C.I." is an abbreviation of "color index" and that in the present invention, the HLB value of a surfactant is a value determined by a Griffin method (the detail of which will be described below).

First, the course of development of the present invention will be described. The present inventors formed images with an ink that contains a water-soluble urethane polymer in addition to C.I. Pigment Yellow 74 and C.I. Pigment Yellow 128 dispersed by a water-soluble acrylic polymer. However, contrary to expectations, the glossiness of the images was not improved. Accordingly, the present inventors have investigated the reasons thereof and have reached the conclusion that the above-mentioned results are due to the following reasons.

The power of the water-soluble acrylic polymer used as the dispersant adsorbing to C.I. Pigment Yellow 128 particles is lower than that to C.I. Pigment Yellow 74 particles. Therefore, when an ink contains C.I. Pigment Yellow 74 only or C.I. Pigment Yellow 128 only as the coloring material, the ink can form images having improved glossiness by containing a water-soluble urethane polymer therein. However, in an ink containing both the pigments, the C.I. Pigment Yellow 74 particles attract the water-soluble acrylic polymer that has adsorbed to the C.I. Pigment Yellow 128 particles. That is, it was revealed that so-called competitive adsorption occurs. This causes an unstable dispersion state of the C.I. Pigment Yellow 128 particles in the ink. If this ink is applied to a recording medium, the particles in the unstable dispersion state drastically aggregate not to form a smooth pigment layer. In addition, in the ink containing the C.I. Pigment Yellow 128 particles in the unstable dispersion state, the water-soluble urethane polymer added for improving glossiness of images tends to adsorb to the C.I. Pigment Yellow 128 particles. Consequently, the amount of the water-soluble urethane polymer that has been primarily added to the ink for filling the spaces between pigment particles after application of the ink to a recording medium is reduced and thereby becomes insufficient for filling the spaces between pigment particles. Due to these reasons, in the ink containing both C.I. Pigment Yellow 74 and C.I. Pigment Yellow 128, glossiness of obtained images could not be improved even if the ink contains the water-soluble urethane polymer, which is thought to be capable of improving glossiness of images.

Accordingly, in order to stably disperse the C.I. Pigment Yellow 128 particles even when the ink also contains C.I. Pigment Yellow 74, which makes the dispersion state unstable, the present inventors have investigated types of surfactants to be added to the ink. This addition was intended to allow the surfactant to adsorb to the pigment particles and to thereby prevent the water-soluble acrylic polymer for stably dispersing the C.I. Pigment Yellow 128 particles from being in short supply. It was supposed that by doing so, the water-soluble urethane polymer to be used for improving glossiness can sufficiently show the function without adsorbing to the C.I. Pigment Yellow 128 particles. As a result of the investigation, it has been revealed that high glossiness can be obtained without deteriorating color developability and light resistance of an image formed on a recording medium (glossy paper) having a coating layer by using a polyoxyethylene alkyl ether having an HLB value of 13.0 or more as the surfactant.

On the other hand, the glossiness of an image could not be improved by containing a polyoxyethylene alkyl ether having an HLB value less than 13.0 or an ethylene oxide adduct of acetylene glycol, which is a surfactant widely used in inks. This is because that a surfactant having a low HLB value to show high hydrophobicity is hardly dissolved in an aqueous medium constituting an ink and, therefore, cannot be adsorbed to the pigment particles at an amount sufficient for maintaining the stable dispersion state of the pigment particles. Furthermore, in order to adsorb a surfactant to pigment particles, the surfactant may need to have carbon atoms providing a certain length, but the carbon chain of the ethylene oxide adduct of acetylene glycol is insufficient for that.

As described above, the present inventors have reached a composition obtained by further adding a water-soluble urethane polymer and a polyoxyethylene alkyl ether having an HLB value of 13.0 or more to an ink containing C.I. Pigment Yellow 74 and C.I. Pigment Yellow 128 dispersed by a water-soluble acrylic polymer. It was revealed that the ink having such a composition can provide an image that is excellent in color developability and light resistance and has high glossiness when glossy paper is used as a recording medium.

However, it was revealed that when an image was formed using an ink having the above-mentioned composition on plain paper as a recording medium, color developability expected by using both C.I. Pigment Yellow 74 and C.I. Pigment Yellow 128 was not achieved. The present inventors have supposed the reasons thereof as follows.

If these pigments are present in an ink, C.I. Pigment Yellow 74 attracts the water-soluble acrylic polymer that has adsorbed to C.I. Pigment Yellow 128, that is, competitive adsorption occurs. Due to the competitive adsorption, a part of the water-soluble acrylic polymer serving as the dispersant was lost from the particle surface of C.I. Pigment Yellow 128, and a portion to which the water-soluble acrylic polymer is not adsorbed, that is, a portion at which the pigment particle is exposed is formed on the particle surface of C.I. Pigment Yellow 128. The dispersion state of C.I. Pigment Yellow 128 becomes stable by allowing the polyoxyethylene alkyl ether having an HLB value of 13.0 or more to adsorb to this portion. However, aggregation of the pigment when water and other components in the ink evaporate tends not to occur in proportion to the adsorption amount. Such a tendency is favorable from the viewpoint of reliability of the ink, but is unfavorable from the viewpoint of an image formed.

For example, in the case of forming an image on a recording medium (glossy paper) having a coating layer, since the diameter of pores of the coating layer is usually smaller than the particle diameter of the pigment, the pigment in the ink fixes on the surface of the recording medium. However, since plain paper does not have the coating layer, in the case of forming an image on the plain paper, the pigment penetrates in the thickness direction of the plain paper, and the color developability of an image varies depending on the position of the penetrated pigment. More specifically, the color developability of an image when the pigment stays at a shallow position of plain paper is relatively high, and the color developability of an image when the pigment is present at a deep position of plain paper is relatively low. The position of a pigment existing in paper is affected by factors such as easiness in aggregation of the pigment when water and other components in the ink evaporate. That is, after application of an ink to plain paper, a pigment that more easily aggregates when water and other components in the ink evaporate hardly penetrates in the thickness direction of plain paper to give good color developability of an image.

Thus, if a too large amount of the polyoxyethylene alkyl ether having an HLB value of 13.0 or more adsorbs to the C.I. Pigment Yellow 128 particles, the pigment hardly aggregates when water and other components in the ink evaporate to easily penetrate in the thickness direction of plain paper. It is supposed that, as a result, the expected color developability of an image formed on plain paper cannot be achieved. Accordingly, in order to improve the color developability of an image formed on plain paper, it may be necessary to superbly control the above-mentioned adsorption amount so that the dispersion of the C.I. Pigment Yellow 128 particles is satisfactorily stable and that the pigment is not prevented from aggregating when water and other components in the ink evaporate.

The present inventors have investigated types of each component added to the ink for controlling the amount of the polyoxyethylene alkyl ether having an HLB value of 13.0 or more adsorbing to the C.I. Pigment Yellow 128 particles. As a result, a conclusion that use of a compound represented by Formula (1) described below is efficient was obtained. Since the polyoxyethylene alkyl ether and the compound represented by Formula (1) each have an ethylene oxide group in their structures, they have affinity to each other. It is supposed that since these compounds adsorb to the C.I. Pigment Yellow 128 particles while interacting with each other, the adsorption amount of the polyoxyethylene alkyl ether having an HLB value of 13.0 or more is superbly controlled to improve the color developability of images on plain paper.

Ink

Each component constituting the ink according to aspects of the present invention that has a yellow hue and is suitable for ink jet recording will be described below.

Pigment

The ink according to aspects of the present invention contains a plurality of pigments. The plurality pigments include C.I. Pigment Yellow 74 and C.I. Pigment Yellow 128 and may further include another known pigment as long as the effects according to aspects of the present invention can be obtained.

The content (% by mass) of C.I. Pigment Yellow 74 in the ink can be 0.1% by mass or more and 10.0% by mass or less based on the total mass of the ink. The content (% by mass) of C.I. Pigment Yellow 128 in the ink can be 0.1% by mass or more and 10.0% by mass or less based on the total mass of the ink. The total content (% by mass) of the pigments in the ink can be 0.2% by mass or more and 15.0% by mass or less, such as 1.0% by mass or more and 10.0% by mass or less, based on the total mass of the ink. In addition, in the ink, the content (% by mass) of C.I. Pigment Yellow 74 can be 0.5 times or more and 2.0 times or less the content (% by mass) of C.I. Pigment Yellow 128, as the mass ratio. That is, the value of (the content of C.I. Pigment Yellow 74)/(the content of C.I. Pigment Yellow 128) can be 0.5 or more and 2.0 or less. When the mass ratio is within the above-mentioned range, both the light resistance and color developability of images can be particularly high. In addition, the content of each pigment for calculating the mass ratio is the content of each pigment based on the total mass of the ink.

According to aspects of the present invention, the primary average particle diameter of the pigment can be 10 nm or larger and 300 nm or smaller. When the primary average particle diameter is smaller than 10 nm, interaction between a plurality of primary particles is too strong, which may readily cause aggregation of the pigment, resulting in insufficient storage stability of the ink. When the primary average particle diameter is larger than 300 nm, the average particle diameter of the pigment is also large, which may cause insufficient color developability and glossiness of images.

According to aspects of the present invention, the dispersion system of the pigments can be a system in which the pigments are dispersed in an aqueous medium by letting a resin dispersant physically adsorb on the surfaces of the pigment particles. The polymer (resin) used as the dispersant may be any polymer that can be used in inks for ink jet recording and can be a water-soluble acrylic polymer described below. The polymers used for dispersing C.I. Pigment Yellow 74 and C.I. Pigment Yellow 128 may be the same or different. In aspects of the present invention, the same kind of polymer can be used.

Surfactant: Polyoxyethylene Alkyl Ether Having an HLB Value of 13.0 or More

The ink according to aspects of the present invention contains a polyoxyethylene alkyl ether having an HLB value of 13.0 or more as a surfactant. The content (% by mass) of the polyoxyethylene alkyl ether having an HLB value of 13.0 or more in the ink can be 0.2% by mass or more and 1.0% by mass or less based on the total mass of the ink. When the content is less than 0.2% by mass, the function of improving the dispersion stability of C.I. Pigment Yellow 128 is low, which may cause insufficient glossiness of images. When the content is more than 1.0% by mass, though the dispersion stability of C.I. Pigment Yellow 128 can be sufficiently improved, the permeability of the ink is high, and which may cause insufficient color developability of images formed on plain paper.

The polyoxyethylene alkyl ether has a structure represented by R—O—$(CH_2CH_2O)_m$H, wherein R is an alkyl group, and m is an integer. In the polyoxyethylene alkyl ether contained in the ink according to aspects of the present invention, the number of carbon atoms of R (alkyl group) being the hydrophobic group in the formula may be in the range in which a surface-activating ability can be provided and may be, for example, 12 to 22. Specific examples of the alkyl group include a lauryl (12) group, a cetyl (16) group, a stearyl (18) group, an oleyl (18) group, and a behenyl (22) group (the numbers in parentheses mean the numbers of carbon atoms of the alkyl groups). Furthermore, the m of the hydrophilic group in the formula of the polyoxyethylene alkyl ether, that is, the number of the ethylene oxide group, can be determined based on the structure of the R and the HLB value and can be 10 to 50, such as 10 to 40.

The HLB value of the polyoxyethylene alkyl ether determined by the Griffin method must be 13.0 or more, such as 15.0 or more. If the HLB value is less than 13.0, the glossiness of images will be insufficient. The upper limit of the HLB value is 20.0 as described below, and the upper limit of the HLB value of the polyoxyethylene alkyl ether that can be used according to aspects of the present invention is also 20.0 or less.

The Griffin method used according to aspects of the present invention for defining the HLB value of a surfactant will now be described. The HLB value in accordance with the Griffin method is determined by the following Expression (2) from the formula weight of the hydrophilic group of a surfactant and the molecular weight of the surfactant and shows the degrees of hydrophilicity and lipophilicity of the surfactant in the range of 0.0 to 20.0. The lower the HLB value, the higher the lipophilicity, i.e., the hydrophobicity of the surfactant. On the contrary, the higher the HLB value, the higher the hydrophilicity of the surfactant.

$$HLB \text{ value} = 20 \times \frac{\text{formula weight of hydrophilic group of surfactant}}{\text{molecular weight of surfactant}} \quad \text{Expression (2)}$$

Compound Represented by Formula (1)

The ink according to aspects of the present invention contains a compound represented by the following Formula (1) as a water-soluble organic solvent. The glossiness of an image formed on glossy paper and the color developability of an image formed on plain paper can be satisfactorily high by containing, together with the particular surfactant described above, the compound represented by the following Formula (1):

$$HO—(CH_2CH_2O)_n—H \quad \text{Formula (1)}$$

Wherein in Formula (1), n is an integer of 1 to 4.

Specifically, the compound represented by Formula (1) is ethylene glycol, diethylene glycol, triethylene glycol, or tetraethylene glycol. The n in Formula (1) shows the number of the ethylene oxide group in the structure. When the n is more than 4, the glossiness of an image formed on glossy paper is insufficient. According to aspects of the present invention, when the compound represented by Formula (1) is triethylene glycol, the glossiness of an image formed on glossy paper and the color developability of an image formed on plain paper can be particularly improved with a good balance therebetween.

In aspects of the present invention, the content (% by mass) of the compound represented by Formula (1) in the ink can be 1.0% by mass or more and 20.0% by mass or less based on the total mass of the ink. When the content is less than 1.0% by mass, the amount of the compound represented by Formula (1) that interacts with the polyoxyethylene alkyl ether having an HLB value of 13.0 or more is small, which may cause insufficient color developability of an image formed on plain paper. On the contrary, when the content is more than 20.0% by mass, the amount of the compound represented by Formula (1) is too large relative to the amount of the polyoxyethylene alkyl ether having an HLB value of 13.0 or more with which the compound represented by Formula (1) interacts. As a result, the polyoxyethylene alkyl ether having an HLB value of 13.0 or more may be prevented from adsorbing to the C.I. Pigment Yellow 128 particles, and the glossiness of an image may be insufficient. Furthermore, in the ink, the content (% by mass) of the compound represented by Formula (1) can be 10.0 times or more and 20.0 times or less the content (% by mass) of the polyoxyethylene alkyl ether having an HLB value of 13.0 or more, as the mass ratio. That is, the value of (the content of the compound represented by Formula (1))/(the content of the polyoxyethylene alkyl ether having an HLB value of 13.0 or more) can be 10.0 or more and 20.0 or less. In this case, the contents of the compound represented by Formula (1) and the polyoxyethylene alkyl ether having an HLB value of 13.0 or more are each the content of each component based on the total mass of the ink. When the mass ratio is out of the above-mentioned range, the interaction between the compound represented by Formula (1) and the polyoxyethylene alkyl ether having an HLB value of 13.0 or more is low, which may cause insufficient color developability of an image formed on plain paper.

Polymer

The ink according to aspects of the present invention contains a plurality of polymers (resins), and the plurality of the polymers includes a water-soluble acrylic polymer and a water-soluble urethane polymer. In aspects of the present invention, that a polymer is water-soluble means that the polymer have no particle diameter when it is neutralized with an alkali in an amount equivalent to the acid value. Polymers satisfying these conditions are described as water-soluble polymers in this specification. Note that the term "(meth) acryl" in the specification includes both acryl and methacryl.

According to aspects of the present invention, the total content (% by mass) of the water-soluble polymers in the ink can be 0.2% by mass or more and 15.0% by mass or less, such as 0.5% by mass or more and 10.0% by mass or less, and even 1.0% by mass or more and 5.0% by mass or less, based on the total mass of the ink. Furthermore, in the ink, the content (% by mass) of the water-soluble acrylic polymer can be 0.1 times or more and 2.0 times or less, such as 0.5 times or more and 1.0 times or less, the content (% by mass) of the water-soluble urethane polymer, as the mass ratio. That is, the value of (the content of the water-soluble acrylic polymer)/(the content of the water-soluble urethane polymer) can be 0.1 or more and 2.0 or less, such as 0.5 or more and 1.0 or less. In this case, the contents of the water-soluble acrylic polymer and the water-soluble urethane polymer for calculating the mass ratio are each the content of each component based on the total mass of the ink.

Water-Soluble Acrylic Polymer

The water-soluble acrylic polymer contained in the ink according to aspects of the present invention may be any polymer having at least an acrylic component such as a unit derived from (meth)acrylic acid or a unit derived from an acrylic ester. More specifically, the water-soluble acrylic polymer can have at least a hydrophilic unit and a hydrophobic unit, such as those exemplified below, as the structural units.

Examples of a monomer becoming the hydrophilic unit by polymerization include monomers having carboxy groups, such as (meth)acrylic acid, itaconic acid, maleic acid, and fumaric acid; monomers having sulfonate groups, such as styrenesulfonic acid; monomers having phosphonate groups, such as (meth)acrylic acid-2-ethyl phosphonate; anionic monomers such as anhydrides and salts of these acidic monomers; and monomers having hydroxy groups, such as 2-hydroxyethyl (meth)acrylate and 3-hydroxypropyl (meth)acrylate. According to aspects of the present invention, the water-soluble acrylic polymer can be an anionic copolymer having at least a hydrophilic unit derived from an anionic monomer. Examples of a cation constituting a salt with the anionic monomer include ions such as lithium, sodium, potassium, ammonium, and organic ammonium.

Examples of a monomer becoming the hydrophobic unit by polymerization include monomers having aromatic rings, such as styrene, α-methylstyrene, and benzyl (meth)acrylate; and monomers having aliphatic groups, such as ethyl (meth) acrylate, methyl (meth)acrylate, (iso)propyl (meth)acrylate, (n-, iso-, or t-)butyl (meth)acrylate, and 2-ethylhexyl (meth) acrylate.

According to aspects of the present invention, in particular, the water-soluble acrylic polymer can be a copolymer having at least a hydrophilic unit derived from (meth)acrylic acid and a hydrophobic unit derived from a monomer having an aromatic ring, such as styrene, α-methylstyrene, or benzyl (meth)acrylate.

According to aspects of the present invention, as described above, the water-soluble acrylic polymer can be used as a resin dispersant for dispersing a pigment. In this case, the content (% by mass) of the water-soluble acrylic polymer in the ink can be 0.1% by mass or more and 10.0% by mass or less based on the total mass of the ink. The weight-average molecular weight of the water-soluble acrylic polymer can be 1,000 or more and 30,000 or less, preferably 3,000 or more and 15,000 or less. The acid value of the water-soluble acrylic polymer can be 50 mg KOH/g or more and 300 mg KOH/g or less, such as 120 mg KOH/g or more and 250 mg KOH/g or less.

The total content of the pigments in the ink can be 0.30 times or more and 10.0 times or less the content of the water-soluble acrylic polymer in the ink, as the mass ratio. That is, the value of (the content of the pigments)/(the content of the water-soluble acrylic polymer) can be 0.30 or more and 10.0 or less. The contents of the pigments and the water-soluble acrylic polymer in this case are each the content of each component based on the total mass of the ink. When the mass ratio is within the range of 0.30 to 10.0, the dispersion state of each pigment can be particularly stably maintained. If the mass ratio is less than 0.30, the amount of the water-soluble acrylic polymer in the ink is excessive, which may cause insufficient color developability and glossiness of images. On the contrary, if the amount of the water-soluble acrylic polymer is too small relative to that of the pigments, the dispersion state of each pigment may be unstable to make storage stability of the ink insufficient. Therefore, the mass ratio can be 10.0 or less.

Water-Soluble Urethane Polymer

The water-soluble urethane polymer contained in the ink according to aspects of the present invention is obtained by reacting a polyisocyanate and a polyol and may be one obtained by further reacting a chain extender. Furthermore, the water-soluble urethane polymer may be a hybrid polymer in which a urethane polymer and another polymer are bonded to each other. The content (% by mass) of the urethane polymer in the ink can be 0.1% by mass or more and 5.0% by mass or less based on the total mass of the ink. The weight-average molecular weight of the water-soluble urethane polymer can be 5,000 or more and 100,000 or less, such as 5,000 or more and 15,000 or less. The acid value of the water-soluble urethane polymer can be 10 mg KOH/g or more and 110 mg KOH/g or less. Furthermore, the acid value of the water-soluble urethane polymer can be less than that of the water-soluble acrylic polymer.

Examples of the polyisocyanate include aliphatic, alicyclic, aromatic, and araliphatic polyisocyanates. Specific examples include aliphatic polyisocyanates such as tetramethylene diisocyanate, hexamethylene diisocyanate, and 2,2,4-trimethylhexamethylene diisocyanate; alicyclic polyisocyanates such as isophorone diisocyanate and 1,4-cyclohexane diisocyanate; aromatic polyisocyanates such as tolylene diisocyanate, xylylene diisocyanate, and 1,4-phenylene diisocyanate; and araliphatic polyisocyanates such as α,α,α,α-tetramethylxylylene diisocyanate.

Examples of the polyol include polyester polyols, polyether polyols, polycarbonate polyols, and polyols having acid groups. In aspects of the present invention, when a water-soluble urethane polymer synthesized using a polyether polyol is used, the water-soluble urethane polymer is prevented from being hydrolyzed, and glossiness of an image can be improved even after a long period of storage of the ink.

Accordingly, such a water-soluble urethane polymer can be used. The urethane polymer contained in the ink according to aspects of the present invention may be required to be water-soluble and, therefore, can have a structure including an acid group such as a carboxy group, a sulfonate group, or a phosphonate group; or a hydrophilic group such as a carbonyl group or a hydroxy group. In particular, a water-soluble urethane polymer synthesized using a polyol having an acid group such as dimethylol propionate or dimethylol butanoate can be used. The acid group may be in a salt state, and examples of a cation constituting the salt include ions such as lithium, sodium, potassium, ammonium, and organic ammonium.

The chain extender is a compound reacting with the remaining isocyanate group that has not formed a urethane bond in the polyisocyanate unit of a urethane prepolymer obtained by reacting a polyisocyanate with a polyol. Examples of the chain extender include multivalent amines such as dimethylolethylamine, ethylenediamine, and diethylenetriamine; multivalent imines such as polyethylenepolyimine; and multivalent alcohols such as neopentyl glycol and butyl ethyl propanediol. In aspects of the present invention, when a water-soluble urethane polymer synthesized using a multivalent alcohol, in particular, neopentyl glycol as the chain extender is used, the glossiness of an image can be particularly effectively improved. Accordingly, such a water-soluble urethane polymer can be particularly used. A multivalent amine or a multivalent imine can be also used as the chain extender, but the urethane polymers synthesized using them have cationic portions in their structures and thereby tend to aggregate and reduce smoothness of image surfaces, which may not sufficiently improve glossiness. On the other hand, the water-soluble urethane polymer synthesized using a multivalent alcohol such as neopentyl glycol as the chain extender does not have a cationic portion in its structure and thereby can particularly effectively improve the glossiness of an image.

Aqueous Medium

The ink according to aspects of the present invention can contain an aqueous medium, which is a solvent mixture of water and a water-soluble organic solvent. The water can be deionized water. The content (% by mass) of the water in the ink can be 50.0% by mass or more and 95.0% by mass or less based on the total mass of the ink. The water-soluble organic solvent may be any water-soluble organic solvent that can be used in inks for ink jet recording, such as alcohols, glycol ethers, and nitrogen-containing compounds. These solvents may be used alone or in combination. The content (% by mass) of the water-soluble organic solvent in the ink can be 3.0% by mass or more and 50.0% by mass or less based on the total mass of the ink. The content of the water-soluble organic solvent is the value including the compound represented by the above-mentioned Formula (1) and at least one of 1,2-alkanediol and glycol ether that are optionally used.

In aspects of the present invention, among the water-soluble organic solvents, in particular, at least one of 1,2-alkanediol and glycol ether can be used. In this case, the content (% by mass) of 1,2-alkanediol and/or glycol ether in the ink is 1.0% by mass or more and 10.0% by mass or less based on the total mass of the ink. The 1,2-alkanediol can be one including an alkyl group having 3 to 8 carbon atoms. Examples of the glycol ether include diethylene glycol monobutyl ether and triethylene glycol monobutyl ether.

The 1,2-alkanediol and/or glycol ether have a function of highly reducing the surface tension of a liquid and thereby can improve wettability of the ink to a recording medium and can make the height of a formed dot low. Accordingly, the smoothness of the image surface can be particularly improved to significantly increase the glossiness of an image formed on glossy paper. In addition, an effect specific to C.I. Pigment Yellow 128 also occurs. Since C.I. Pigment Yellow 128 includes a fluorine atom in its molecular structure, the surface energy of the pigment particle is low. When an ink containing the pigment is applied to a recording medium and forms a dot, the pigment particles are hardly smoothly laminated due to the low surface energy of the pigment contained in a dot previously formed and a dot subsequently formed. However, when the pigments exist together with 1,2-alkanediol and/or glycol ether in the ink, these water-soluble organic solvents can allow the pigment particles to be smoothly laminated in spite of the low surface energy of the pigment. As a result, an image can have particularly excellent glossiness.

Other Components

The ink according to aspects of the present invention may contain a water-soluble organic compound that is solid at ordinary temperature, such as urea, its derivative, trimethylol propane, or trimethylol ethane, in addition to the above-mentioned components. The content (% by mass) of the water-soluble organic compound that is solid at ordinary temperature in the ink can be 0.1% by mass or more and 20.0% by mass or less, such as 3.0% by mass or more and 10.0% by mass or less, based on the total mass of the ink. The ink may optionally further contain various auxiliaries such as another surfactant, an anti-foam agent, a pH adjuster, an antiseptic agent, an antifungal agent, a corrosion inhibitor, an antioxidant, and a reduction inhibitor.

Preparation of Ink

The above-described ink according to aspects of the present invention can be prepared according to a common method, for example, as follows. First, a mixture of an aqueous solution containing a water-soluble acrylic polymer and pigments are subjected to dispersing treatment to obtain a pigment dispersion containing the pigments dispersed by the water-soluble acrylic polymer. Then, the obtained pigment dispersion is mixed with other components including a water-soluble urethane polymer to prepare an ink. In aspects of the present invention, two kinds of pigments are used. These pigments may be mixed with each other in advance and then subjected to preparation of a pigment dispersion to be mixed with other components to prepare an ink. Alternatively, the pigments may be separately subjected to dispersing treatment, and the obtained pigment dispersions may be mixed with other components to prepare an ink. In each case, an ink in which the pigments are dispersed by the water-soluble acrylic polymer can be easily obtained by dispersing each pigment by the water-soluble acrylic polymer in advance and then mixing the dispersion or dispersions with a water-soluble urethane polymer. According to such a method, the water-soluble urethane polymer contained in the ink for improving glossiness of an image can efficiently show the effect in aspects of the present invention.

Ink Cartridge

The ink cartridge according to aspects of the present invention includes an ink storage portion for storing an ink, and the above-described ink according to aspects of the present invention is stored in the ink storage portion. In an example of the structure of the ink cartridge, the ink storage portion is composed of an ink storage chamber for storing a liquid ink and a negative pressure generating member-containing chamber for containing a negative pressure generating member that retains the ink therein by a negative pressure. The ink cartridge may have a structure in which an ink storage portion is configured so that the negative pressure generating member retains the whole quantity of the ink contained without having the ink storage chamber for storing a liquid ink. Furthermore, the ink cartridge may be configured so as to have an ink storage portion and a recording head.

Ink Jet Recording Method

The ink jet recording method according to aspects of the present invention is a method of recording an image on a recording medium by ejecting the above-described ink according to aspects of the present invention by a recording head of an ink jet system. Examples of the system for ejecting an ink include a system in which mechanical energy is applied to an ink and a system in which thermal energy is applied to an ink. In aspects of the present invention, an ink jet recording system using thermal energy can be employed. The process of ink jet recording can be performed by known steps by using the ink according to aspects of the present invention. In aspects of the present invention, the recording medium may be, for example, paper having ink absorbing ability such as plain paper or a recording medium (glossy paper) having a coating layer.

The ink according to aspects of the present invention may be used in combination with other different inks in an ink set. The hues of the other different inks can be one or more selected from, for example, cyan, magenta, yellow, black, red, green, and blue. As the inks constituting an ink set, a plurality of inks that have the same hue as that of each ink and have different contents of the pigment may be used. Examples of such a combination of a plurality of inks include a combination of inks having cyan hues such as deep cyan, medium cyan, and light cyan and a combination of inks having magenta hues such as deep magenta, medium magenta, and light magenta. Furthermore, as the inks constituting an ink set, a clear ink not containing coloring materials may be used. The inks that are used in combination with the ink according to aspects of the present invention to constitute an ink set are not limited to the above, and the names for definitions of inks, such as deep, medium, light, and clear, are not limited to them.

EXAMPLES

Aspects of the present invention will be described in more detail with reference to examples and comparative examples below, but is not limited to the following examples as long as not departing from the gist of the present invention. Note that the terms "part(s)" and "%" regarding the amounts of components are based on mass, unless otherwise specified.

Preparation of Pigment Dispersion

A mixture of 10.0 parts of a pigment (C.I. Pigment Yellow 74), 20.0 parts of an aqueous solution of a resin dispersant, and 70.0 parts of deionized water was dispersed with a batch-type vertical sand mill for 3 hours. As the aqueous solution of a resin dispersant, used was an aqueous solution that contained a styrene/acrylic acid copolymer (water-soluble acrylic polymer) having an acid value of 170 mg KOH/g and a weight-average molecular weight of 8,000 and neutralized with an aqueous solution of sodium hydroxide and that had a polymer solid content of 10.0%. Then, coarse particles were removed by centrifugation, and pressure filtration was performed using a cellulose acetate filter having a pore size of 3.0 μm (manufactured by Advantec) to obtain a pigment dispersion A1 having a pigment content of 10.0% and a polymer content of 2.0%. Similarly, a pigment dispersion B1 having a pigment content of 10.0% and a polymer content of 2.0% was prepared as in above except that the pigment was C.I. Pigment Yellow 128.

A pigment dispersion A2 containing C.I. Pigment Yellow 74 and a pigment dispersion B2 containing C.I. Pigment Yellow 128 were prepared as in above except that a benzyl acrylate/acrylic acid copolymer (water-soluble acrylic polymer) having an acid value of 170 mg KOH/g and a weight-average molecular weight of 8,000 was used as the water-soluble polymer. In each of the pigment dispersions A2 and B2, the content of the pigment was 10.0%, and the content of the polymer was 2.0%.

Preparation of Water-Soluble Urethane Polymer

Urethane Polymer A

To methyl ethyl ketone, 50.3 parts of a polytetramethylene glycol having a number-average molecular weight of 2,000 was added. The resulting mixture was sufficiently stirred for dissolution, followed by addition of 33.5 parts of isophorone diisocyanate and 14.3 parts of dimethylol propionate. The resulting mixture was subjected to a reaction at 75° C. for 1 hour to obtain a solution containing a prepolymer. The obtained solution was cooled to 60° C., and an aqueous solution of potassium hydroxide was added thereto to neutralize the carboxy group of the prepolymer. Subsequently, the solution was cooled to 40° C., and deionized water was added thereto. The resulting solution was stirred at high speed with a homomixer for emulsification. Then, 1.9 parts of neopentyl glycol (chain extender) was added to the resulting emulsion, and a chain-extending reaction of the prepolymer was performed at 30° C. for 12 hours. Once the presence of the isocyanate group was not confirmed by FT-IR, methyl ethyl ketone was distilled away from the solution under heating and reduced pressure. Thus, a water-soluble urethane polymer A (acid value: 60 mg KOH/g, weight-average molecular weight: 10,000) including 20.0% polymer (solid content) was obtained.

Urethane Polymer B

To methyl ethyl ketone, 50.7 parts of a polytetramethylene glycol having a number-average molecular weight of 2,000 was added. The resulting mixture was sufficiently stirred for dissolution, followed by addition of 33.8 parts of isophorone diisocyanate and 14.3 parts of dimethylol propionate. The resulting mixture was subjected to a reaction at 75° C. for 1 hour to obtain a solution containing a prepolymer. The obtained solution was cooled to 60° C., and an aqueous solution of potassium hydroxide was added thereto to neutralize the carboxy group of the prepolymer. Subsequently, the solution was cooled to 40° C., and deionized water was added thereto. The resulting solution was stirred at high speed for emulsification with a homomixer. Then, 1.2 parts of ethylene diamine (chain extender) was added to the resulting emulsion, and a chain-extending reaction of the prepolymer was performed at 30° C. for 12 hours. Once the presence of the isocyanate group was not confirmed by FT-IR, methyl ethyl ketone was distilled away from the solution under heating and reduced pressure. Thus, a water-soluble urethane polymer B (acid value: 60 mg KOH/g, weight-average molecular weight: 15,000) including 20.0% polymer (solid content) was obtained.

Polyoxyethylene Alkyl Ether

Table 1 shows the structures, HLB values, numbers of carbon atoms of alkyl groups (hydrophobic groups), and numbers of moles of added ethylene oxide groups (hydrophilic groups) of the polyoxyethylene alkyl ether (surfactant) used for preparation of inks. In Table 1, NIKKOL BC-7, BO-15V, BC-20, and BO-50 are products manufactured by Nikko Chemicals Co., Ltd., and EMALEX 512, 712, and 112 are products manufactured by Nihon-Emulsion Co., Ltd.

TABLE 1

Structure and physical properties of polyoxyethylene alkyl ether

| | Structure | HLB value | Number of carbon atom | Number of moles of added ethylene oxide group |
|---|---|---|---|---|
| NIKKOL BC-7 | polyoxyethylene cetyl ether | 11.2 | 16 | 7 |
| EMALEX 512 | polyoxyethylene oleyl ether | 13.3 | 18 | 12 |
| NIKKOL BO-15V | polyoxyethylene oleyl ether | 14.2 | 18 | 15 |
| EMALEX 712 | polyoxyethylene lauryl ether | 14.8 | 12 | 12 |
| EMALEX 117 | polyoxyethylene cetyl ether | 15.1 | 16 | 17 |
| NIKKOL BC-20 | polyoxyethylene cetyl ether | 15.7 | 16 | 20 |
| NIKKOL BO-50 | polyoxyethylene oleyl ether | 17.8 | 18 | 50 |

Preparation of Ink

The components (Unit: %) shown in the upper rows in Tables 2 to 4 were respectively mixed and sufficiently stirred, followed by pressure filtration using a cellulose acetate filter having a pore size of 0.8 μm (manufactured by Advantec) to prepare the respective inks. In the preparation of inks, the polyethylene glycol used had a number-average molecular weight of 600, and Acethylenol E100 was an ethylene oxide (10) adduct of acetylene glycol (manufactured by Kawaken Fine Chemicals Co., Ltd.). The content A (%), the content B (%), and the value (ratio) of A/B shown in the lower rows in Tables 2 to 4 are, respectively, the content of the compound represented by Formula (1) in the ink, the content of the polyoxyethylene alkyl ether having an HLB valued of 13.0 or more, and the mass ratio of these compounds.

TABLE 2

Composition and main characteristics of ink

| | Example 1 | 2 | 3 | 4 | 5 | 6 | 7 | 8 | 9 | 10 |
|---|---|---|---|---|---|---|---|---|---|---|
| Pigment dispersion A1 | 20.00 | 20.00 | | | 20.00 | 20.00 | 20.00 | 20.00 | 20.00 | 20.00 |
| Pigment dispersion A2 | | | 20.00 | 20.00 | | | | | | |
| Pigment dispersion B1 | 20.00 | 20.00 | | | 20.00 | 20.00 | 20.00 | 20.00 | 20.00 | 20.00 |
| Pigment dispersion B2 | | | 20.00 | 20.00 | | | | | | |
| Urethane polymer A | 10.00 | 10.00 | 10.00 | 10.00 | 10.00 | 10.00 | 10.00 | 10.00 | 10.00 | 10.00 |
| Urethane polymer B | | | | | | | | | | |
| Glycerin | 10.00 | 10.00 | 10.00 | 10.00 | 10.00 | 10.00 | 10.00 | 10.00 | 10.00 | 10.00 |
| Ethylene glycol | | | | | | | | | | |
| Diethylene glycol | | | | | | | | | | |
| Triethylene glycol | 5.00 | 5.00 | 5.00 | 5.00 | 2.50 | 3.00 | 6.00 | 7.00 | 5.00 | 3.00 |
| Tetraethylene glycol | | | | | | | | | | |
| Polyethylene glycol | | | | | | | | | | |
| 1,2-Hexanediol | 5.00 | | 5.00 | | 5.00 | 5.00 | 5.00 | 5.00 | 5.00 | 5.00 |
| Triethylene glycol monobutyl ether | | 5.00 | | 5.00 | | | | | | |
| NIKKOL BC-7 | | | | | | | | | | |
| EMALEX 512 | | | | | | | | | | |
| NIKKOL BO-15V | | | | | | | | | | |
| EMALEX 712 | | | | | | | | | | |
| EMALEX 117 | | | | | | | | | | |
| NIKKOL BC-20 | 0.30 | 0.30 | 0.30 | 0.30 | 0.30 | 0.30 | 0.30 | 0.30 | 0.15 | 0.20 |
| NIKKOL BO-50 | | | | | | | | | | |
| Acethylenol E100 | 1.00 | 1.00 | 1.00 | 1.00 | 1.00 | 1.00 | 1.00 | 1.00 | 1.00 | 1.00 |
| Deionized water | 28.70 | 28.70 | 28.70 | 28.70 | 31.20 | 30.70 | 27.70 | 26.70 | 28.85 | 30.80 |
| Content A (%) | 5.00 | 5.00 | 5.00 | 5.00 | 2.50 | 3.00 | 6.00 | 7.00 | 5.00 | 3.00 |
| Content B (%) | 0.30 | 0.30 | 0.30 | 0.30 | 0.30 | 0.30 | 0.30 | 0.30 | 0.15 | 0.20 |
| Value (ratio) of A/B | 16.7 | 16.7 | 16.7 | 16.7 | 8.3 | 10.0 | 20.0 | 23.3 | 33.3 | 15.0 |

TABLE 3

Composition and main characteristics of ink

| | Example 11 | 12 | 13 | 14 | 15 | 16 | 17 | 18 | 19 | 20 |
|---|---|---|---|---|---|---|---|---|---|---|
| Pigment dispersion A1 | 20.00 | 20.00 | 20.00 | 20.00 | 20.00 | 20.00 | 20.00 | 20.00 | 20.00 | 20.00 |
| Pigment dispersion A2 | | | | | | | | | | |
| Pigment dispersion B1 | 20.00 | 20.00 | 20.00 | 20.00 | 20.00 | 20.00 | 20.00 | 20.00 | 20.00 | 20.00 |
| Pigment dispersion B2 | | | | | | | | | | |
| Urethane polymer A | 10.00 | 10.00 | 10.00 | 10.00 | 10.00 | 10.00 | 10.00 | 10.00 | 10.00 | 10.00 |
| Urethane polymer B | | | | | | | | | | |
| Glycerin | 10.00 | 10.00 | 10.00 | 10.00 | 10.00 | 10.00 | 10.00 | 10.00 | 10.00 | 10.00 |
| Ethylene glycol | | | 5.00 | | | | | | | |
| Diethylene glycol | | | | 5.00 | | | | | | |

TABLE 3-continued

Composition and main characteristics of ink

| | Example | | | | | | | | | |
|---|---|---|---|---|---|---|---|---|---|---|
| | 11 | 12 | 13 | 14 | 15 | 16 | 17 | 18 | 19 | 20 |
| Triethylene glycol | 10.00 | 5.00 | | | | 5.00 | 5.00 | 5.00 | 5.00 | 5.00 |
| Tetraethylene glycol | | | | | 5.00 | | | | | |
| Polyethylene glycol | | | | | | | | | | |
| 1,2-Hexanediol | 5.00 | 5.00 | 5.00 | 5.00 | 5.00 | 5.00 | 5.00 | 5.00 | 5.00 | 5.00 |
| Triethylene glycol monobutyl ether | | | | | | | | | | |
| NIKKOL BC-7 | | | | | | | | | | |
| EMALEX 512 | | | | | | 0.30 | | | | |
| NIKKOL BO-15V | | | | | | | 0.30 | | | |
| EMALEX 712 | | | | | | | | 0.30 | | |
| EMALEX 117 | | | | | | | | | 0.30 | |
| NIKKOL BC-20 | 1.00 | 1.20 | 0.30 | 0.30 | 0.30 | | | | | |
| NIKKOL BO-50 | | | | | | | | | | 0.30 |
| Acethylenol E100 | 1.00 | 1.00 | 1.00 | 1.00 | 1.00 | 1.00 | 1.00 | 1.00 | 1.00 | 1.00 |
| Deionized water | 23.00 | 27.80 | 28.70 | 28.70 | 28.70 | 28.70 | 28.70 | 28.70 | 28.70 | 28.70 |
| Content A (%) | 10.00 | 5.00 | 5.00 | 5.00 | 5.00 | 5.00 | 5.00 | 5.00 | 5.00 | 5.00 |
| Content B (%) | 1.00 | 1.20 | 0.30 | 0.30 | 0.30 | 0.30 | 0.30 | 0.30 | 0.30 | 0.30 |
| Value (ratio) of A/B | 10.0 | 4.2 | 16.7 | 16.7 | 16.7 | 16.7 | 16.7 | 16.7 | 16.7 | 16.7 |

TABLE 4

Composition and main characteristics of ink

| | Example | | | Comparative Example | | | | | | |
|---|---|---|---|---|---|---|---|---|---|---|
| | 21 | 22 | 23 | 1 | 2 | 3 | 4 | 5 | 6 | 7 |
| Pigment dispersion A1 | 20.00 | 20.00 | 20.00 | 4.00 | | 20.00 | 20.00 | 20.00 | 20.00 | 20.00 |
| Pigment dispersion A2 | | | | | | | | | | |
| Pigment dispersion B1 | 20.00 | 20.00 | 20.00 | | 4.00 | 20.00 | 20.00 | 20.00 | 20.00 | 20.00 |
| Pigment dispersion B2 | | | | | | | | | | |
| Urethane polymer A | 10.00 | | | 10.00 | 10.00 | | 10.00 | 10.00 | 10.00 | 10.00 |
| Urethane polymer B | | 10.00 | 10.00 | | | | | | | |
| Glycerin | 10.00 | 10.00 | 10.00 | 10.00 | 10.00 | 10.00 | 10.00 | 10.00 | 10.00 | 10.00 |
| Ethylene glycol | | | | | | | | | | |
| Diethylene glycol | | | | | | | | | | |
| Triethylene glycol | 5.00 | 5.00 | | 5.00 | 5.00 | 5.00 | | | 5.00 | 5.00 |
| Tetraethylene glycol | | | 5.00 | | | | | | | |
| Polyethylene glycol | | | | | | | 5.00 | | | |
| 1,2-Hexanediol | | 5.00 | | 5.00 | 5.00 | 5.00 | 5.00 | 5.00 | 5.00 | 5.00 |
| Triethylene glycol monobutyl ether | | | | | | | | | | 0.30 |
| NIKKOL BC-7 | | | | | | | | | | |
| EMALEX 512 | | | | | | | | | | |
| NIKKOL BO-15V | | | | | | | | | | |
| EMALEX 712 | | | 0.15 | | | | | | | |
| EMALEX 117 | | | | | | | | | | |
| NIKKOL BC-20 | 0.30 | 0.30 | | 0.30 | 0.30 | 0.30 | 0.30 | 0.30 | | |
| NIKKOL BO-50 | | | | | | | | | | |
| Acethylenol E100 | 1.00 | 1.00 | 1.00 | 1.00 | 1.00 | 1.00 | 1.00 | 1.00 | 1.00 | 1.00 |
| Deionized water | 33.70 | 28.70 | 33.85 | 64.70 | 64.70 | 38.70 | 33.70 | 28.70 | 29.00 | 28.70 |
| Content A (%) | 5.00 | 5.00 | 5.00 | 5.00 | 5.00 | 5.00 | 0.00 | 0.00 | 5.00 | 5.00 |
| Content B (%) | 0.30 | 0.30 | 0.15 | 0.30 | 0.30 | 0.30 | 0.30 | 0.30 | 0.00 | 0.00 |
| Value (ratio) of A/B | 16.7 | 16.7 | 33.3 | 16.7 | 16.7 | 16.7 | 0.0 | 0.0 | — | — |

Evaluation

An ink cartridge filled with each ink obtained in the above was set to an ink jet recording apparatus (PIXUS Pro 9500, manufactured by CANON KABUSHIKI KAISHA) equipped with a recording head that ejects ink by thermal energy. A pattern including two types of solid images having recording duties of 50% and 100%, respectively, was recorded on each of glossy paper (Canon photographic paper glossy gold GL-101, manufactured by CANON KABUSHIKI KAISHA) and plain paper (PB PAPER GF-500, manufactured by CANON KABUSHIKI KAISHA). Note that in the above-mentioned ink jet recording apparatus, an image that has been recorded with a resolution of 600 dpi×600 dpi under conditions that a unit area of 1/600 inch square receives eight droplets each having a weight of 3.5 ng is defined as a recording duty of 100%.

In the present invention, the evaluation criteria in each of the following evaluation items are that C: not acceptable, B: acceptable, and A: excellent. The evaluation results are shown in Table 5.

Evaluation of Color Developability

Recorded matters produced using plain paper were naturally dried for 24 hours, and then the solid image with a recording duty of 100% of each recorded matter was measured for optical density of a yellow component prescribed by the spectral sensitivity characteristic (ISO Status A) for color developability evaluation. The measurement was conducted with a spectrophotometer (Spectrolino, manufactured by Gretag Macbeth Co.). The evaluation criteria of color developability are as follows:
A: an optical density of 1.2 or more,
B: an optical density of 1.0 or more and less than 1.2, and
C: an optical density of less than 1.0.

Evaluation of Light Resistance

Recorded matters produced using glossy paper were naturally dried for 24 hours, and then each recorded matter was put in Xenon Weather-Ometer Ci4000 (manufactured by Atlas Co.) and was irradiated with xenon light having an irradiation intensity of 0.39 W/m² under conditions of a black panel temperature of 63° C. and a relative humidity of 70% for 300 hours. The solid image with a recording duty of 50% of each recorded matter was measured before and after the irradiation for L*, a*, and b* values according to the CIELab color system using a spectrophotometer (Spectrolino, manufactured by Gretag Macbeth Co.). The values of E, $E=\{(L^*)^2+(a^*)^2+(b^*)^2\}^{1/2}$, were calculated, and $\Delta E$ was determined from the values of E before and after the irradiation for light resistance evaluation. The evaluation criteria of light resistance are as follows:
A: $\Delta E$ of 5 or less,
B: $\Delta E$ of more than 5 and 15 or less, and
C: $\Delta E$ of more than 15.

Evaluation of Glossiness

Recorded matters produced using glossy paper were naturally dried for 24 hours, and then the solid image with a recording duty of 100% of each recorded matter was subjected to the following evaluation. Using two fluorescent lamps arranged with an interval of 10 cm as observation light sources, pictures of the fluorescent lamps were projected onto the image from a distance of 2 m with a light angle of 45 degrees and an observation angle of 45 degrees, and the shapes of the pictures of the fluorescent lamps projected on the image were visually observed for glossiness evaluation. The evaluation criteria of glossiness are as follows:
A: pictures of two fluorescent lamps were clearly projected on the image,
B: the edges of pictures of two fluorescent lamps projected on the image slightly blurred, and
C: the boundary between pictures of two fluorescent lamps was not recognized.

TABLE 5

| | | Evaluation results | | |
|---|---|---|---|---|
| | | Glossiness | Coloring | Light resistance |
| Example | 1 | A | A | A |
| | 2 | A | A | A |
| | 3 | A | A | A |
| | 4 | A | A | A |
| | 5 | A | B | A |
| | 6 | A | A | A |
| | 7 | A | A | A |
| | 8 | A | B | A |
| | 9 | B | B | A |
| | 10 | A | A | A |
| | 11 | A | A | A |
| | 12 | A | B | A |
| | 13 | A | B | A |
| | 14 | A | B | A |
| | 15 | A | B | A |
| | 16 | B | A | A |
| | 17 | B | A | A |
| | 18 | B | A | A |
| | 19 | A | A | A |
| | 20 | A | A | A |

TABLE 5-continued

| | | Evaluation results | | |
|---|---|---|---|---|
| | | Glossiness | Coloring | Light resistance |
| | 21 | B | A | A |
| | 22 | B | A | A |
| | 23 | B | B | A |
| Comparative Example | 1 | A | C | C |
| | 2 | A | C | A |
| | 3 | C | A | A |
| | 4 | A | C | A |
| | 5 | C | B | A |
| | 6 | C | A | A |
| | 7 | C | A | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-194045 filed Aug. 31, 2010, which is hereby incorporated by reference herein in its entirety.

What is claimed is:

1. An ink comprising:
a plurality of pigments,
a plurality of water-soluble polymers,
a surfactant, and
a water-soluble organic solvent;
wherein the surfactant includes a polyoxyethylene alkyl ether having an HLB value of 13.0 or more as a value determined by a Griffin method;
the plurality of pigments include C.I. Pigment Yellow 74 and C.I. Pigment Yellow 128;
the plurality of water-soluble polymers include an acrylic polymer and a urethane polymer; and
the water-soluble organic solvent includes a compound represented by the following Formula (1):

$$\text{HO—(CH}_2\text{CH}_2\text{O)}_n\text{—H} \quad\quad\quad \text{Formula (1)}$$

wherein in Formula (1), n is an integer of 1 to 4.

2. The ink according to claim 1, wherein
the content (% by mass) of the compound represented by Formula (1) in the ink is 10.0 times or more and 20.0 times or less the content (% by mass) of the polyoxyethylene alkyl ether, as the mass ratio.

3. The ink according to claim 1, wherein
the content (% by mass) of the polyoxyethylene alkyl ether in the ink is 0.2% by mass or more and 1.0% by mass or less based on the total mass of the ink.

4. The ink according to claim 1, wherein
the compound represented by Formula (1) is triethylene glycol.

5. The ink according to claim 1, wherein
the polyoxyethylene alkyl ether has an HLB value of 15.0 or more as a value determined by the Griffin method.

6. The ink according to claim 1, wherein
the water-soluble organic solvent further includes at least one of 1,2-alkanediol and glycol ether.

7. The ink according to claim 1, wherein
a chain extender of the urethane polymer is neopentyl glycol.

8. An ink cartridge comprising an ink storage portion for storing an ink, wherein the ink storage portion stores an ink according to claim 1.

9. An ink jet recording method for recording an image on a recording medium by ejecting an ink by an ink jet system, wherein the ink is an ink according to claim 1.

10. The ink according to claim 1, wherein the acid value of the water-soluble acrylic polymer is 50 mg KOH/g or more and 300 mg KOH/g or less.

11. The ink according to claim 1, wherein the acid value of the water-soluble urethane polymer is 10 mg KOH/g or more and 110 mg KOH/g or less.

12. The ink according to claim 1, wherein the acid value of the water-soluble urethane polymer is less than that of the water-soluble acrylic polymer.

13. The ink according to claim 1, wherein the total content of the pigments in the ink is 0.30 times or more and 10.0 times or less the content of the water-soluble acrylic polymer in the ink, as the mass ratio.

14. The ink according to claim 13, wherein plurality of pigments are dispersed in the ink by the acrylic polymer.

15. The ink according to claim 1, wherein the content (% by mass) of C.I. Pigment Yellow 74 is 0.5 times or more and 2.0 times or less the content (% by mass) of C.I. Pigment Yellow 128, as the mass ratio.

16. The ink according to claim 1, wherein the content (% by mass) of the water-soluble acrylic polymer is 0.1 times or more and 2.0 times or less the content (% by mass) of the water-soluble urethane polymer, as the mass ratio.

17. The ink according to claim 1, wherein the content (% by mass) of the compound represented by Formula (1) is 10.0 times or more and 20.0 times or less the content (% by mass) of the polyoxyethylene alkyl ether having an HLB value of 13.0 or more, as the mass ratio.

18. The ink according to claim 1, wherein the ink is for ink jet recording.

\* \* \* \* \*